United States Patent
Brothers et al.

(10) Patent No.: US 6,789,182 B1
(45) Date of Patent: Sep. 7, 2004

(54) SYSTEM AND METHOD FOR LOGGING COMPUTER EVENT DATA AND PHYSICAL COMPONENTS OF A COMPLEX DISTRIBUTED SYSTEM

(76) Inventors: Kevin Jay Brothers, 1022 Ten Rod Rd., Exeter, RI (US) 02822; David Bruce Cousins, 12 John St., Barrington, RI (US) 02806; Brian John Palmer, 278 Blvd., Middletown, RI (US) 02842; Frederick John Roeber, 246 Fairview La., Portsmouth, RI (US) 02871; Scott Davis Stafford, 117 Deer Trail Rd., Wakefield, RI (US) 02879

(*) Notice: Subject to any disclaimer, the term of this patent is extended or adjusted under 35 U.S.C. 154(b) by 619 days.

(21) Appl. No.: 09/711,822
(22) Filed: Nov. 13, 2000
(51) Int. Cl.[7] .................... G06F 15/173; G06F 11/34; G06F 1/12
(52) U.S. Cl. .................... 712/30; 712/28; 712/29; 712/31; 712/227; 714/39; 714/51; 713/502
(58) Field of Search .................... 714/37, 38, 39, 714/16, 18, 51; 712/28, 36, 227, 31, 29, 30, 22; 710/107, 260; 379/140; 701/207, 213; 717/128; 713/502

(56) References Cited

U.S. PATENT DOCUMENTS

| | | | | |
|---|---|---|---|---|
| 5,255,183 A | * | 10/1993 | Katz | 379/140 |
| 5,375,070 A | | 12/1994 | Hershey et al. | |
| 5,426,774 A | * | 6/1995 | Banerjee et al. | 714/16 |
| 5,465,359 A | | 11/1995 | Allen et al. | |
| 5,623,599 A | * | 4/1997 | Shomler | 714/18 |
| 5,682,328 A | | 10/1997 | Roeber et al. | 364/550 |
| 5,751,245 A | * | 5/1998 | Janky et al. | 701/207 |
| 5,901,325 A | * | 5/1999 | Cox | 710/107 |
| 5,982,995 A | | 11/1999 | Covert et al. | |
| 6,021,457 A | * | 2/2000 | Archer et al. | 710/260 |
| 6,073,255 A | | 6/2000 | Nouri et al. | |

OTHER PUBLICATIONS

Alan Mink, Wayne Salamon, Jeffrey Hollingsworth, Ramu Arunachalam, "Performance Measurement using Low Perturbation and High Precision Hardware Assists", Proc IEEE Real–Time Systems Symposium, Madrid, Spain, pp. 379–388 (Dec. 1998).

Alan Mink, "Multikron: Performance Measurement Instrumentation"Proc IEEE International Computer Performance & Dependability Symposium, Urbana–Champaign, III, pp. 55 (Sep. 1996).

Yves A. Fouquet, Richard D. Scheeman, David E. Cypher, Alan Mink, "ATM Performance Measurement", Proc of International Conf on Telecommunication, Distribution, Parallelism (TDP'96), La Londe Les Maures, France, pp. 63–75 (Jun. 1996).

Alan Mink, Robert J. Carpenter, George Nacht, John Roberts, Multiprocessor Performance—Measurement Instrumentation, IEEE Computer, pp. 63–75 (Sep. 1990).

Alan Mink, Robert J. Carpenter, Chip Set for a Multiprocessor Performance Measurement System, Performance Instrumentation and Visulaization, Chp. 14, pp. 213–232, ACM Press, Addison–Wesley Publishing Company (1990).

(List continued on next page.)

*Primary Examiner*—Daniel H. Pan
(74) *Attorney, Agent, or Firm*—Ropes & Gray LLP

(57) ABSTRACT

A system for collecting events relating to multiple distributed physical systems includes multiple event collection cards (100), each receiving events from one of the distributed physical systems. Each event collection card includes a time stamp clock (120) configured to provide a time stamp when each event is received, an event memory (110) configured to store the received events, a sync interface unit (130) configured to receive a sync signal, a sync control unit (125) configured to synchronize the time stamp clock (120) to the sync signal received by the sync interface (130), and a collection control unit (115) configured to time stamp the collected events according to the time stamp clock (120) synchronized to the sync signal, and to store the time stamped events in the event memory (110).

40 Claims, 7 Drawing Sheets

OTHER PUBLICATIONS

Dieter Haban et al., A Hybrid Monitor for Behavior and Performance Analysis of Distributed Systems, IEEE Transactions on Software Engineering, vol. 16, No. 2 (Feb. 1990) pp. 197–211.

Jeffrey J.P. Tsai et al., A Noninvasive Architecture To Monitor Real–Time Distributed Systems, IEEE Computer, vol. 23, No. 3 (Mar. 1990), pp. 11–23.

David M. Ogle et al., Application–Dependent Dynamic Monitoring of Distributed and Parallel Systems, IEEE Transactions on Parallel and Distributed Systems, vol. 4, No. 7 (Jul. 1993( pp. 762–778.

A. Mink et al., Hardware Measurement Techniques for High–Speed Networks, Journal of High Speed Networks 3 (1994), pp. 187–207.

* cited by examiner

SYSTEM AND METHOD FOR LOGGING COMPUTER EVENT DATA AND PHYSICAL COMPONENTS OF A COMPLEX DISTRIBUTED SYSTEM

RELATED APPLICATION

The present application is a continuation-in-part of co-pending application Ser. No. 09/432,618, entitled "System and Method for Logging Computer Event Data in a Distributed System," filed on Nov. 3, 1999. +gi

GOVERNMENT CONTRACT

The U.S. Government has a paid-up license in this invention and the right in limited circumstances to require the patent owner to license others on reasonable terms as provided for by the terms of Contract No. F30602-97-0296, awarded by Defense Advanced Research Projects Agency.

BACKGROUND OF THE INVENTION

1. Field of the Invention

The present invention relates generally to methods and systems for logging event data and, more particularly, to methods and systems for logging computer program and physical system event data in a distributed system.

2. Description of the Related Art

Software visualization tools are well known in the art for providing ways to analyze the flow of a computer software program during the testing and debugging process. These tools track the time and value of certain events as they occur while running the program. Such tools typically implement a concept known as "event logging" to monitor and record events as they take place within the monitored program.

Generally, event logging is implemented by "instrumenting" the computer software program. Instrumenting includes adding code at key points in the monitored program. The added code creates a record of when particular events occur in the program as it is being run on the computer. The created record typically contains a set of entries for individual events, such as an entry for the type of event (e.g., I/O or bus operation), the start and end of the event, and an associated value of the event. The time of the event may be based on the system clock. A programmer may then analyze the record of events to determine what events took place and when.

Event logging is even more difficult and time consuming in a distributed system. In such a case, programmers must try to align in time events occurring across multiple computers. One conventional way programmers deal with this situation is by manually comparing the event logs collected from different computers. Programmers then try to time align them based on known operational sequences between the different computers. Not surprisingly, this approach yields highly inaccurate results.

Some conventional event monitoring systems have been implemented purely in software as event logging programs. Most event logging programs execute the monitored program on the same computer as the software that performs the event logging functions. Thus, the event logging program effectively shares hardware resources with the monitored program. Because the event logging functions are fairly time consuming, they will interfere with the process flow of the monitored program, thereby making the recorded events less useful.

Hardware-based approaches often fail to have the necessary system components to support optimal event logging. For instance, many processors do not have access to a high resolution clock for determining when events occur. Furthermore, in distributed applications involving multiple computers, the event data cannot be correlated in time. Although some conventional systems may use a clock on each computer to time stamp the events, these clocks typically have no way of being coordinated or synchronized with one another. Nor do such systems provide an event collection program suited for collating coordinated event data from the different computers. Any such systems that synchronize clocks must be running on the same system bus.

Hybrid implementations of event monitoring systems are known in the prior art. Generally, these systems use event logging software running on dedicated hardware other than the system being monitored. The primary advantage of such system is that they minimize any interference with the system running the monitored program. In one conventional system, specialized hardware running event monitoring software for the specific monitoring application can be implemented in each node of a distributed system.

The conventional system includes a special "test and measurement processor" ("TMP") that facilitates event monitoring upon receipt of a data value issued by an instrumented program running on a target or monitored processor. The target processor running the monitored program issues data according to events occurring in the instrumented monitored program. The TMP receives the data issued by the monitored program and target processor as incoming data. Event monitoring software running on the TMP then decodes the incoming data and records the particular event.

This conventional system is limited in several respects, however. Most importantly is that the conventional system cannot log events produced by computer programs running on target processors located throughout a distributed system. The conventional system only allows collecting of events running on processors located on the same bus to which the TMP is connected.

Another conventional system includes an event logging system that addresses some of the limitations found in the above-mentioned conventional system. This second conventional system uses a hybrid approach in the form of a computer control card configured on the backplane containing the target processor. The control card has its own processor for time tagging events on the target processors its monitors. But, like the first conventional system, the event logging system of the second conventional system cannot monitor events of computer programs running on processors throughout a distributed system. The second conventional system can only log events on the target processors connected to the associated backplane. The event logging system of the second conventional system further cannot monitor events of computer programs concurrently with other physical processes/systems located throughout a distributed system.

Therefore, it is desired to have an event logging system that can accurately log events of computer software programs running on processors throughout a distributed system. Moreover, it is desired to have such a system that also minimizes any intrusion into the program flow of the monitored program. It is further desired to have an event logging system that can log events, related to distributed physical processes/systems, concurrently with events of computer software programs.

SUMMARY OF THE INVENTION

Systems consistent with the present invention allow for concurrent event logging of computer software programs running on processors and physical processes/systems in a distributed system. Systems consistent with the present invention also minimize intrusion into the program flow of the monitored program by efficiently collecting and logging the events of monitored programs.

To achieve these and other advantages, an event logging system consistent with the present invention collects events relating to a plurality of target programs. Each program runs on a respective target processor, and each target processor is located on a separate system bus. An event logging system consistent with the present invention further collects events relating to a plurality of physical system electrical devices. The system comprises a plurality of event collection cards, each for receiving events from a respective one of the plurality of target programs or the plurality of physical system electrical devices. Each event collection card, respective target processor and physical system electrical device may be installed on the same system bus.

A further aspect of the present invention comprises a system for collecting events relating to multiple distributed physical systems. The system includes multiple event collection cards, each receiving events from one of the distributed physical systems. Each event collection card includes a time stamp clock configured to provide a time stamp when each event is received, an event memory configured to store the received events, a sync control unit configured to synchronize the time stamp clock to a received sync signal, and a collection control unit configured to time stamp the collected events according to the time stamp clock synchronized to the sync signal, and configured to store the time stamped events in the event memory.

An additional aspect of the present invention comprises a method of collecting events relating to distributed physical systems. The method includes collecting events relating to one of the distributed physical systems, receiving a sync signal, synchronizing a time stamp clock to the received sync signal, time stamping the collected events according to the time stamp clock synchronized to the sync signal, and storing the time-stamped events.

Both the foregoing general description and the following detailed description are exemplary and are intended to provide further explanation of the invention as claimed.

BRIEF DESCRIPTION OF THE DRAWINGS

The accompanying drawings provide a further understanding of the invention and, together with the detailed description, explain the principles of the invention. In the drawings.

DETAILED DESCRIPTION

Embodiments of the present invention will now be described with references to the accompanying drawings. Whenever possible, the same reference numbers represent the same or similar elements in the different drawings.

Systems and methods consistent with the present invention provide an event logging system that collects events from monitored programs and physical system electrical devices in a distributed system. To this end, the event logging system includes an event collection card for each computer and/or physical system electrical device in the distributed system. Computers in the distributed system may or may not be interconnected, other than through the functions of their associated event collection cards. Each event collection card may collect events from all of the monitored programs running on a target processor in the computer corresponding to that card. Thus, all target processors located on the same computer may send events to the same event collection card. Each event collection card may further collect events relating to changes in the state of electrical/electronic circuitry contained in, or associated with, physical system electrical devices. In the following description, the term "event" refers to any software-related event occurring in or generated by a monitored program, including an event occurring in or generated by a software thread of the monitored program or any change in state of electrical/electronic circuitry associated with physical system electrical devices.

The event logging system synchronizes the clocks of each event collection card with one another. In this way, each of the event collection cards can accurately time stamp events related to one another. In addition, the event logging system also allows target processors and physical system electrical devices to write events to the event collection cards using low data overhead. Finally, the event logging system also operates at high speed, allowing parallel processing of event collecting and event formatting.

Exemplary System Organization

Figure 1:
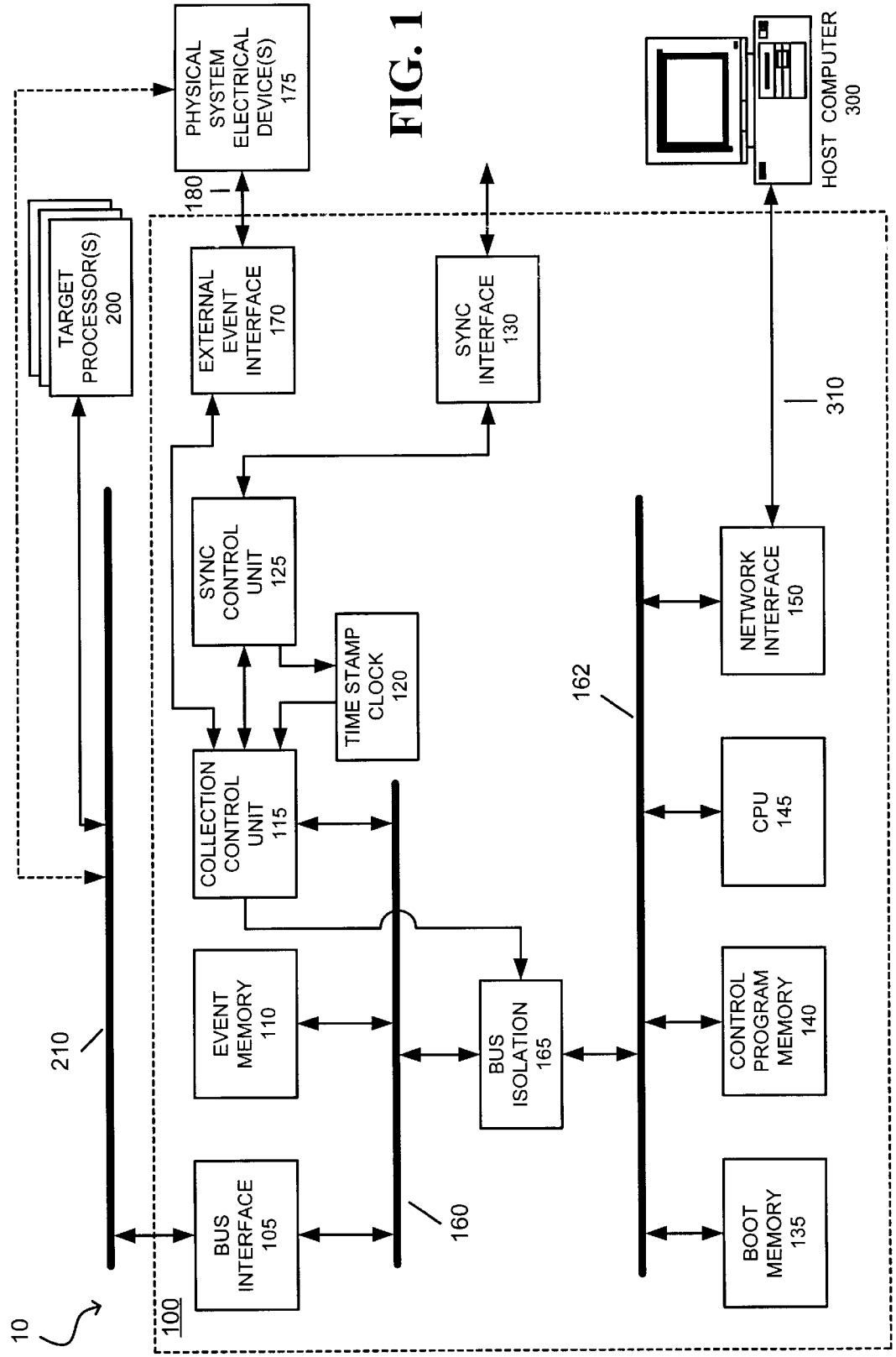
FIG. 1 is a block diagram of an event logging system consistent with the present invention.

FIG. 1 is a block diagram of an event logging system 10 consistent with the present invention. As shown in FIG. 1, system 10 includes an event collection card 100, target processor(s) 200, a host computer 300, and physical system electrical device(s) 175. Physical system electrical devices may include, but are not limited to, electrical devices that monitor or measure changes in the state of any physical system or process, such as mechanical, chemical, and biological systems or processes, or programmable hardware (e.g., field programmable gate arrays (FPGA's)). Event collection card 100 may be connected to target processor(s) 200 and physical system electrical device(s) 175 via a common backplane or bus 210, such as a Peripheral Component Interconnect (PCI) bus. Further, event collection card 100 communicates with host computer 300 over a link 310, which may include, for example, a system bus, a cable connection, a local area network, or a wide area network. Additionally, event collection card 100 may be connected to physical system electrical device(s) 175 over a link 180, which may include, for example, a system bus, a cable connection, a local area network, a wide area network, an intranet, or internet. Although FIG. 1 shows only one event collection card 100, an event logging system 10 consistent with the present invention preferably includes multiple cards synchronized together to collect events from distributed processors and/or physical systems/processes.

Each event collection card 100 may receive event information from a corresponding target processor(s) 200 and/or physical system electrical device(s) 175. After collecting and formatting the event information, event collection card 100 sends the collected event information to host computer 300 for display to a user. The event information received by each event collection card 100 may relate to events that occur while a corresponding target processor 200 is running a particular computer software program, often referred to as the monitored program. The event information received by each event collection card 100 further may relate to changes in the state of electrical/electronic circuitry contained in, or associated with, physical system electrical device(s) 175.

To send the events as they occur while the program is running, the monitored program may be instrumented with event logging requests, such as calls to a macro, that initiate event collection by event collection card 100. The calls and macros may be defined by a log interface library resident on target processor 200. A programmer may instrument the program and define a macro to send the event information using techniques well known in the art, such as those described in U.S. Pat. No. 5,682,328.

To send physical process events as they occur, physical system electrical device(s) 175 may include conventional interface hardware and/or software for transmitting and receiving electrical signals to and from external event interface 170. For example, if physical system electrical device (s) 175 includes an FPGA designed with a conventional file-oriented computer aided hardware design language (e.g., VHDL or Verilog), then the physical system electrical device(s) 175 may include an event logging library written in a conventional hardware design language. The event logging library can automatically generate the necessary logic and output circuitry to generate an event signal whenever a line of code in the language is executed (e.g., whenever a state of a finite state machine is activated).

When each monitored program runs on an associated target processor 200, it first performs an event log initialization with event collection card 100. During initialization, each program and thread thereof is assigned a unique address range. As target processor 200 writes events for that program, it writes the event information to the specified address range. Upon receipt of the event information, event collection card 100 decodes the lower address bits to determine an identification value for an event generated by a particular software thread in the monitored program. Event collection card 100 then stores the identification value, a time stamp value, and any other optional data included in the written data.

Each physical system electrical device(s) 175 may also perform an event log initialization with event collection card 100. During initialization, each physical system electrical device 175 is assigned a unique address range. As each physical system electrical device 175 writes events, it writes the event information to the specified address range. Upon receipt of the event information, event collection card 100 decodes the lower address bits to determine an identification value for an event generated by a particular physical system electrical device 175. Event collection card 100 then stores the identification value, a time stamp value, and any other optional data included in the written data.

As shown in FIG. 1, event collection card 100 includes a bus interface 105, an event memory 110, and a collection control unit 115, each communicating over an event collection bus 160. Event collection card 100 further includes a time stamp clock 120, a sync control unit 125, a sync interface 130, and an external event interface 170. External event interface 170 may include conventional circuitry for transmitting and receiving electrical signals to and from physical system electrical device(s) 175. Also included is a boot memory 135, a control program memory 140, a computer processing unit (CPU) 145, and a network interface 150, each communicating over a local bus 162. Buses 160 and 162 communicate via a bus isolation unit 165, such that buses 160 and 162 may operate in parallel.

Bus interface 105 receives event information from target processor 200 via bus 210 and forwards the event information to collection control unit 115 over event collection bus 160. External event interface 170 receives event information from physical system electrical device(s) 175 and forwards the event information to collection control unit 115. Once the event information from target processor(s) 200 and/or physical system electrical device(s) 175 is received, collection control unit 115 decodes the lower address bits to determine the event identification value (ID). Control unit 115 then time stamps the event ID, along with any included event data, according to the time of time stamp clock 120. Time stamp clock 120 is preferably a high resolution clock (e.g., an atomic clock) or counter having, for example, a resolution of one microsecond. Collection control unit 115 then stores the time-stamped event information in event storage memory 110. Event memory 10 is preferably a first-in-first-out (FIFO) memory. Finally, control unit 115 may update a FIFO count value indicating the number of events currently stored in event memory 10.

Sync control unit 125 and sync interface 130 manage the synchronization functions between different event collection cards 100 of event logging system 10. Sync interface 130 receives synchronization control signals, such as a sync pulse and/or a start/stop instruction, and converts the received signals for processing by sync control unit 125. If the synchronization signal is a signal associated with a time-based global positioning system (GPS), then sync interface 130 preferably receives a synchronization control signal from an external GPS receiver known to those skilled in the art. However, sync interface 130 may include such a GPS receiver, or any other circuitry known in the art, for receiving and decoding external synchronization signals.

Sync control unit 125 then calibrates or synchronizes time stamp clock 120 based on the synchronization control signals. In one embodiment, sync control unit 125 also controls the operation of collection control unit 115 based upon a start or stop instruction received through sync interface 130. In another embodiment, collection control unit 115 receives a start or stop instruction from target processor 200, physical system electrical device(s) 175, or host computer 300. Furthermore, collection control unit 115 may forward to sync control unit 125 a start or stop request received from target processor 200, physical system electrical device(s) 175, or host computer 300 requesting that event collecting begin or end. In systems consistent with the present invention, collection control unit 115 and sync control unit 125 are implemented using an FPGA chip. By forming both control units on a single FPGA chip, the speed of the event collecting increases, thereby reducing the intrusiveness of event collection card 100 in the flow of the monitored computer program.

Once event information has been stored in event memory 110, CPU 145 intermittently receives the stored event information and formats the newly collected information for downloading to host computer 300. CPU 145 operates according to a control program stored in control program memory 140. Initially, this control program may be stored in boot memory 135, which is preferably a non-volatile memory, such as a FLASH or PROM memory. During boot-up, the control program of boot memory 135 may be downloaded into control program memory 140. This arrangement allows the control program in boot memory 135 to be easily updated to add new functionality to event collection card 100. If host computer 300 is busy, memory 140 may buffer events for later downloading to computer 300.

As described above, buses 160 and 162 are isolated from one another by bus isolation unit 165. When the two buses are isolated, each may communicate data irrespective of the operation of the other bus. In this way, event collection card 100 allows collection control unit 115 to receive events from bus interface 105 over bus 160, while, at the same time, CPU 145 may format event information over bus 162 for transmission to host computer 300. By providing two buses 160 and 162 operating in parallel, the speed of event collection card 100 greatly increases. Collection control unit 115 may control the operations of bus isolation unit 165 to allow communication between buses 160 and 162 only when bus 160 is not actively receiving new events from target processor(s) 200.

After CPU 145 has formatted the newly collected event information, CPU 145 sends the formatted event information over link 310 to host computer 300 via network interface 150. Host computer 300 preferably executes a software visualization tool well known in the art, such as Time Scan from Etnus Corporation or Visual Analyzer by Microsoft included in the Microsoft Visual Studio. The software visualization tool receives the formatted event information from each event collection card 100 in system 10 and processes the event information using a graphical user interface program to display the event information to a user.

Figure 2:
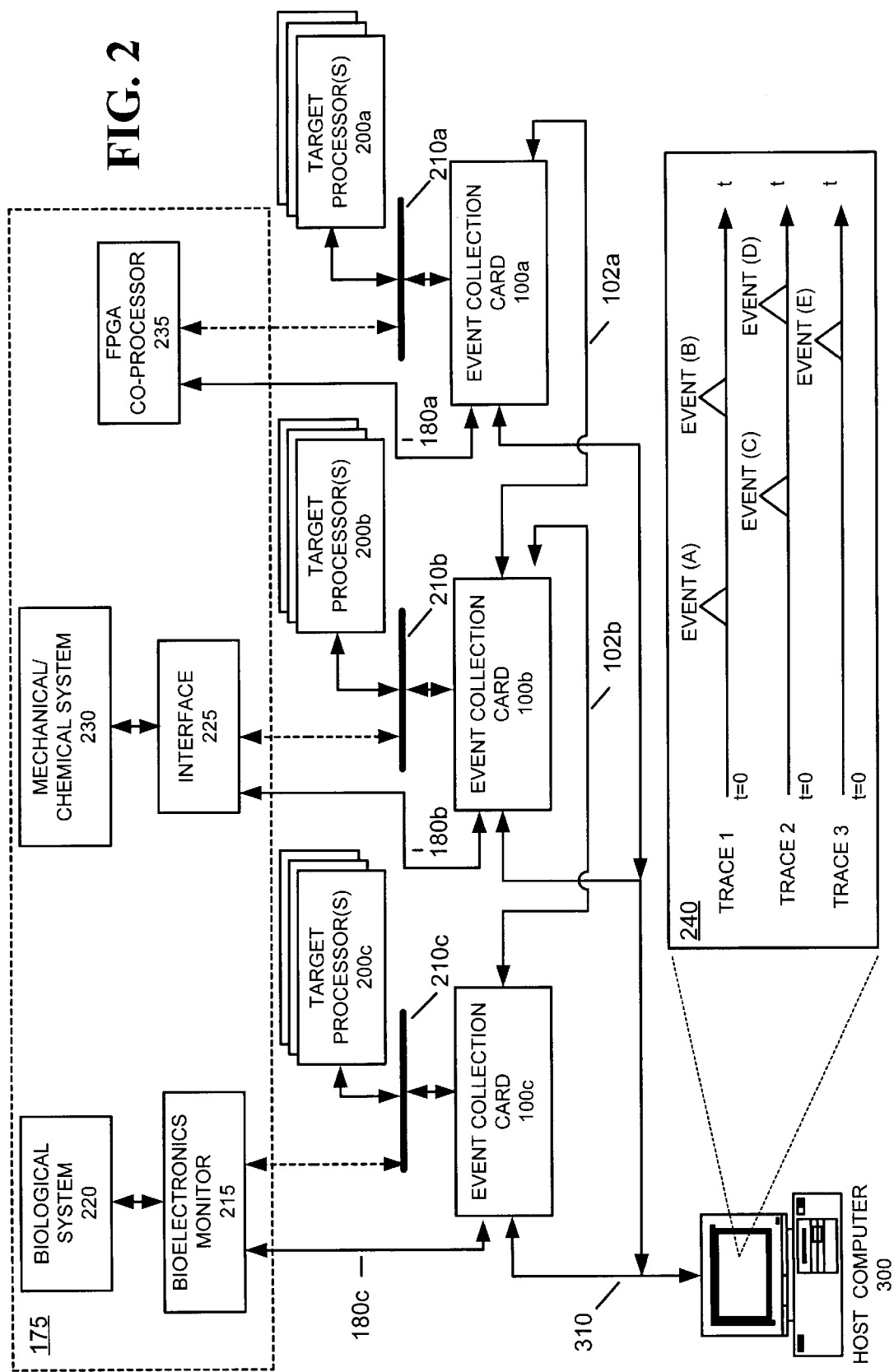
FIGS. 2 and 3 are block diagrams illustrating synchronization in an event logging system consistent with the present invention.
Figure 3:
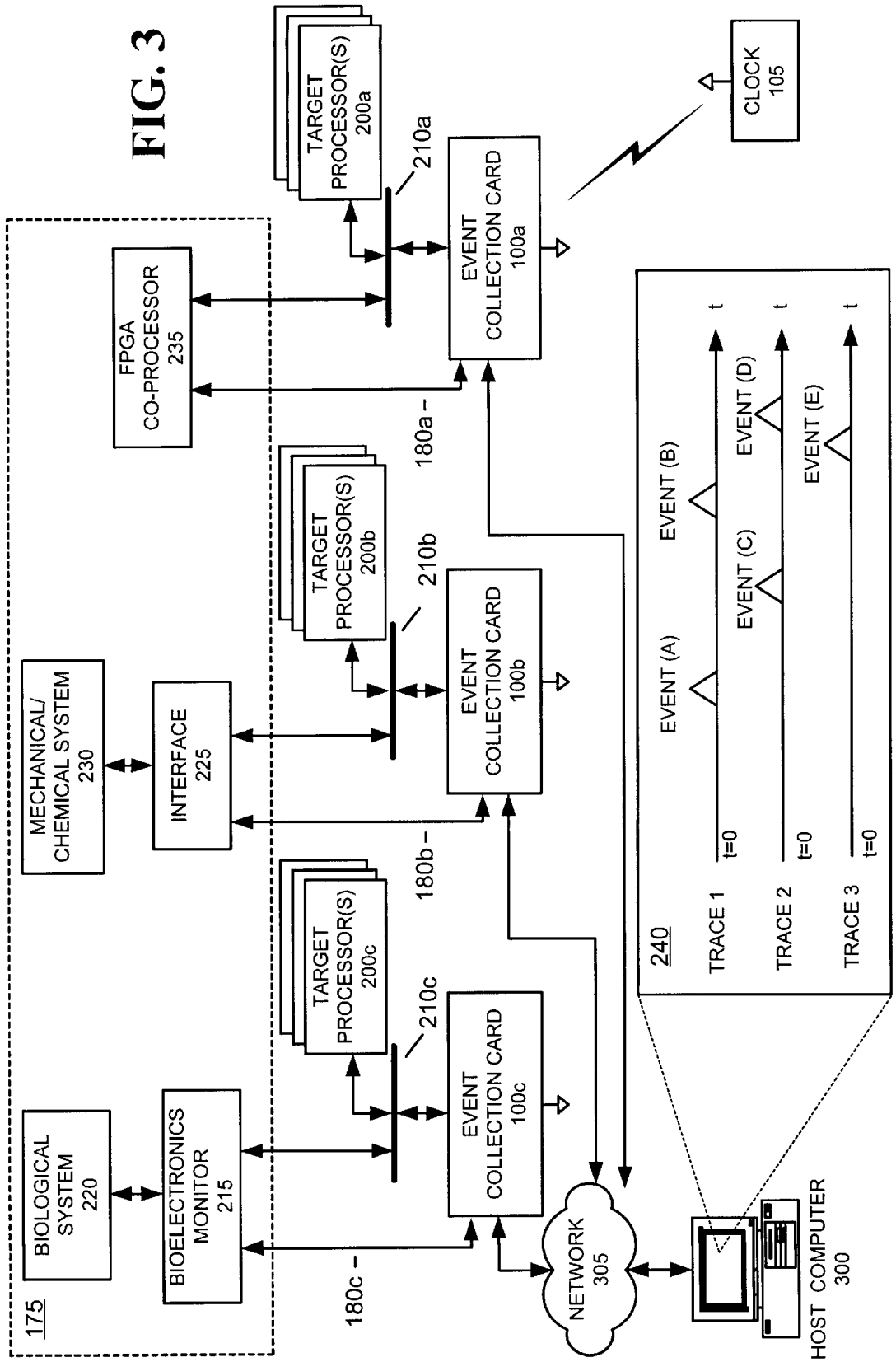

FIGS. 2 and 3 are block diagrams illustrating multiple event collection cards 100 synchronized together in an event logging system consistent with the present invention. Each arrangement shown in FIGS. 2 and 3 allow event collection cards 100 to time synchronize their respective time stamp clocks 120 together. The event logging system can then monitor computer programs across multiple computers while accurately time stamping the events of each program relative to one another. The event logging system can additionally monitor electrical signals received from multiple physical system electrical devices 175 while accurately time stamping the electrical signal events relative to one another. FIGS. 2 and 3 depict examples of physical system electrical device(s) 175, including bioelectronics monitor 215 connected to biological system 220, interface 225 connected to mechanical/chemical system 230 and FPGA co-processor 235. Biological system 220 can include, for example, a human being and bioelectronics monitor 215 can include, for example, a pulse and respiration monitor. Mechanical/Chemical system 230 can include any mechanical and/or chemical system that requires the measurement of physical state changes. Interface 225 can include conventional mechanisms for converting physical state changes of mechanical/chemical system 230 into electrical signals for communication to event collection card 100b. FPGA co-processor 235 can include a processor functionally associated with target processor(s) 200a.

As shown in FIG. 2, event collection cards 100a, 100b, and 100c are connected by lines 102 in a daisy chain fashion. Each collection card 100 is connected to a corresponding target processor(s) 200a, 200b, and 200c via a respective bus 210a, 210b, and 210c. Each collection card 100 can be further connected to a corresponding physical system electrical device(s) 175 via a respective bus 210a, 210b, 210c or via links 180a, 180b, or 180c. When connected in this way, the time stamp clock 120 of one of the event collection cards acts as a master synchronization clock that synchronizes clocks 120 of the other event collection cards. The particular event collection card that synchronizes the other cards to its own clock is referred to as the master card. The other event collection cards are referred to as slave cards since they synchronize to the clock of the master card. In the embodiment of FIG. 2, event collection card 100a is the mastercard, while event collection cards 100b and 100c are slave cards.

As described in greater detail below with respect to FIG. 4, master card 100a sends a sync signal over line 102a to slave card 110b. Slave card 100b then synchronizes its time stamp clock based on the sync signal received over line 102a. Further, slave card 100b forwards the sync signal to slave card 100c over line 102b. Like slave card 100b, slave card 100c will then synchronize its time stamp clock 120 based on the received sync signal.

FIG. 3 shows an alternative embodiment in which multiple event collection cards 100 are synchronized using a sync signal received from an external source. As shown in FIG. 3, the event logging system includes event collection cards 100a, 100b, and 100c connected to a corresponding target processor(s) 200a, 200b, and 200c via a respective bus 210a, 210b, and 210c. Event collection cards 100a, 100b, and 100c can further be connected to a corresponding physical system electrical device(s) 175 via a respective bus 210a, 210b, 210c or via links 180a, 180b, or 180c. Collection cards 100 receive sync signals from an external clock source 105 via sync interface 130. In systems consistent with the invention, external clock source 105 may be any type of distributed clock source, such as, for example, a synchronous wide area network clock, or a device or system capable of transmitting a radio frequency high-resolution sync signal, such as a pulse received through a time-based Global Positioning System (GPS).

Event collection cards 100a, 100b, and 100c each receive the transmitted sync signal via a respective sync interface 130 and synchronize their clocks based on the received signal. Because the event collection cards 100 of FIG. 3 are not physically connected, they may each be located in distant locations. Event collection cards 100a, 100b, and 100c may then communicate with host computer 300 via a network 305, such as a wide area network (WAN). In this way, an event logging system consistent with the invention may log event information from target processor(s) 200 or physical system electrical device(s) 175 that are distributed throughout a wide geographic area.

FIGS. 2 and 3 further show an exemplary display 240 on host computer 300 shown to a user through the event visualization software. The event visualization software resident on host computer 300 receives the formatted event information provided by event collection card 100 and displays this information to the user. As shown in FIGS. 2 and 3, the event visualization software displays for each trace (i.e., a computer program, or thread thereof, running on a particular target processor or a change of state signal from a physical system electrical device) the time a particular event occurred and each event's relation in time to other events occurring on other traces. Moreover, because the clocks of each event collection card 100 are synchronized to one another, the events of each trace are accurately time stamped in relation to one another. Thus, the display of each trace begins at a common point in time (e.g., t=0 sec.).

FIGS. 2 and 3 show traces 1 to 3 having events A to E. Each trace may be based on events collected from a different event collection card 100. As shown in the figures. a user can accurately determine the time of each event in relation to other events. Because each trace originates at the same point in time (e.g., t=0), the events of different traces can be accurately compared to one another. For example, the display shows to a user that event C occurred after event A and before event B.

Exemplary System Operation

As described above, event logging systems consistent with the present invention preferably include synchronized event collection cards 100. FIGS. 4 and 5 are flow diagrams illustrating synchronization methods consistent with the present invention. In particular, each flow chart illustrates a method that may be invoked by each event collection card 100 during the synchronization process. FIG. 4 illustrates a synchronization method for an event logging system configured as shown in FIG. 2, while FIG. 5 illustrates a synchronization method for an event logging system configured as shown in FIG. 3.

Figure 4:
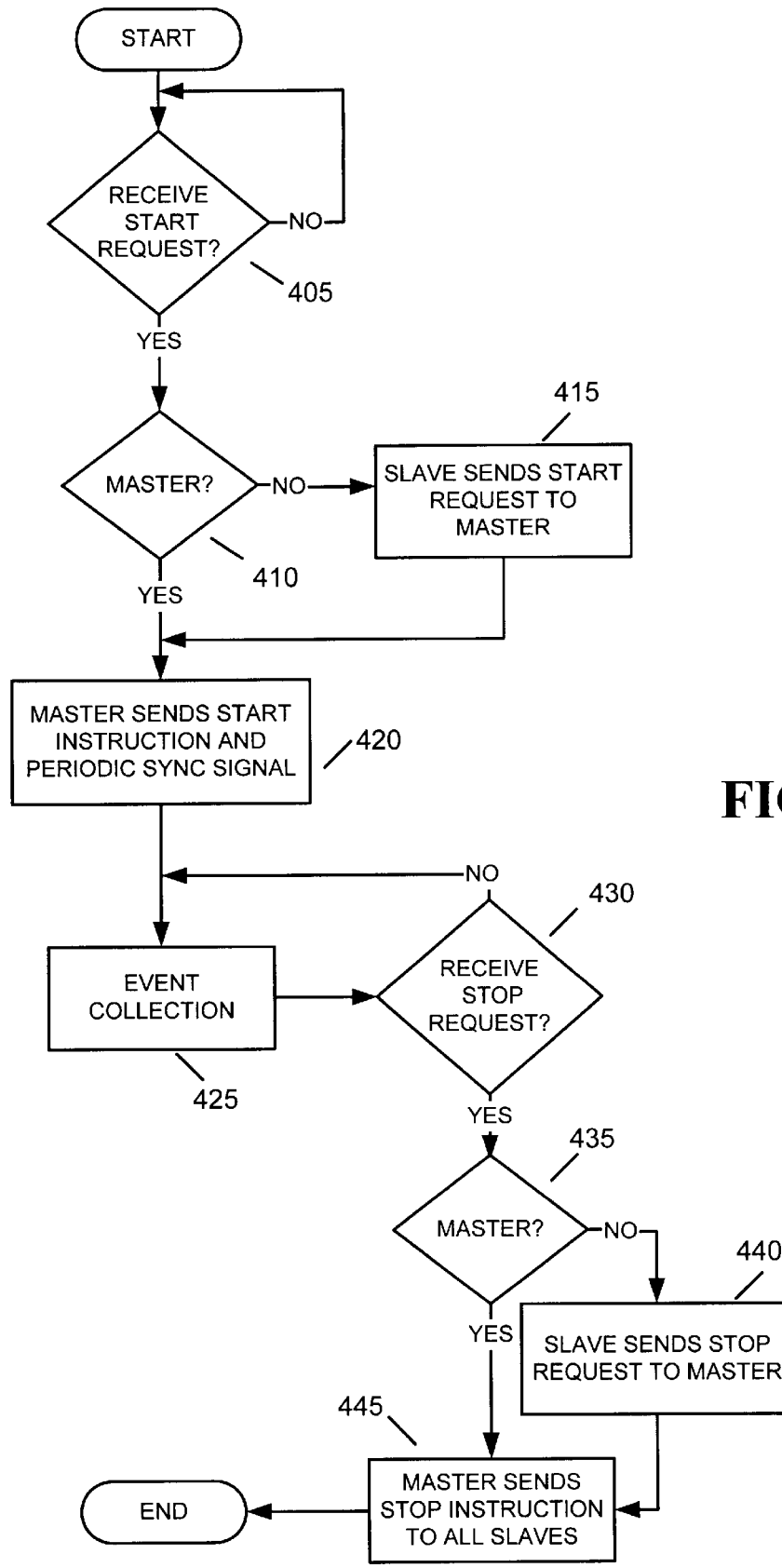
FIGS. 4 and 5 are flow diagrams illustrating synchronization methods consistent with the present invention.
Figure 5:
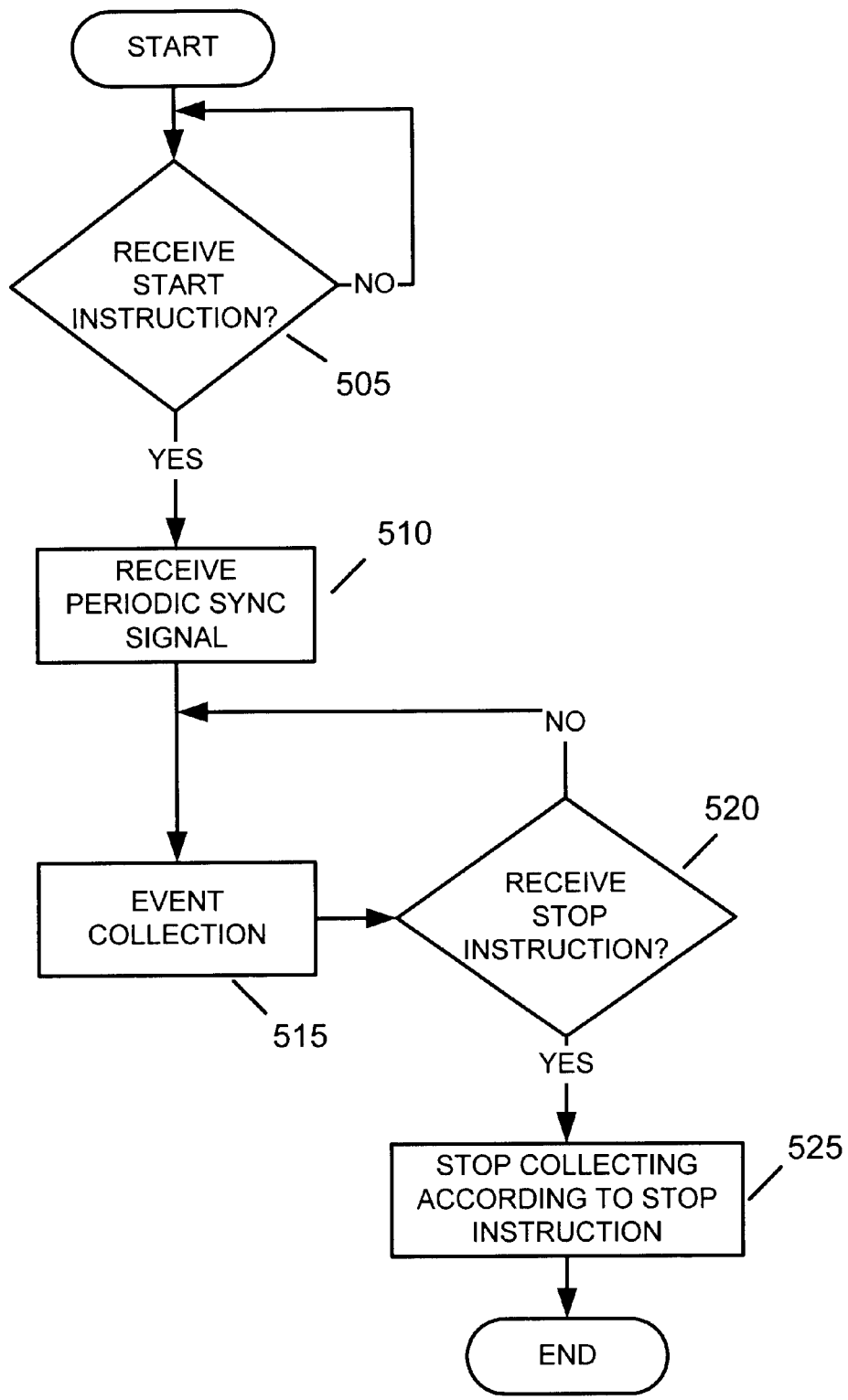

As shown in FIG. 4, the method begins with collection control unit 115 of event collection card 100 determining whether it has received a start request from target processor(s) 200, host computer 300, physical system electrical device(s) 175 (step 405). Target processor(s) 200 may transmit a start request when the instrumented computer software program running on target processor 200 calls a macro that request the start of event collecting. Additionally, a user of host computer 300 may transmit a start request. Further, physical system electrical device(s) 175 may transmit a start request when a change of state occurs in electrical/electronic circuitry associated with device(s) 175. The start request preferably requests that all collection cards 100 begin collection events at the same time. Systems consistent with the present invention, however, may include start requests that request that only a subset of event collection cards 100 begin collecting events.

If collection control unit 115 receives a start request, then collection control unit 115 determines whether event collection card 100 is the master card or a slave card (step 410). Only the master card can initiate the synchronization process since all other cards synchronize to the master card's clock. Thus, if event collection card 100 is a slave card, collection control unit 115 instructs sync control unit 125 to forward the request to the master card (step 415). If the neighboring card is not the master card, then the slave card forwards the request to the first upstream slave card in the daisy-chain connection, which then similarly forwards the request until it reaches the master card.

If, or once, the master card itself has received the start request, then it sends a start instruction and periodically sends a sync signal to each of the slave cards (step 420). With regard to the start instruction, it instructs event collection cards 100, identified according to the start request, to begin collecting events from target processor(s) 200 and/or physical system electrical device(s) 175. With regard to the sync signal, it is propagated along the daisy chain to each of the slave cards in the manner described above with respect to FIG. 2.

In systems consistent with the invention, the sync signal is a pulse informing sync control unit 125 that time stamp clock 120 must be at a present time. Upon receiving the sync signal, sync control unit 125 controls time stamp clock 120 to insure that clock 120 is at the present time. Thus, upon receipt of the sync signal, sync control unit 125 may increment time stamp clock 120 to the desired time if clock 120 has not yet reached the present time. If, on the other hand, clock 120 reaches the present time before the sync signal is received, then sync control unit 125 will stop time stamp clock 120 until the sync signal is received. If clock 120 reaches the preset time at the same time the sync signal is received, then clock 120 will simply continue without any interruption. The present time is preferably hard-wired or software coded into sync control unit 115.

As described above, the master card periodically sends the sync signal to the slave cards. In systems consistent with the invention, the sync signal may be sent periodically using a preset period such as, for example, a period of 512 microseconds (e.g., sync signal sent every 512 microseconds). Thus, each time a sync signal is received, sync control unit 125 will ensure that the time clock 120 is at an appropriate multiple of the preset period (for example, a multiple of 512 microseconds). In this way, all of the slave cards periodically resynchronize upon receipt of the sync signal.

Event collection card 100 then collects event information (step 425) until it receives a stop request (step 430). Although the stop request preferably requests that all event collection cards 100 stop collecting events, the stop request may request that only a subset of cards 100 stop. Further, like the start request, the stop request may be received from either target processor(s) 200, host computer 300, or physical system electrical device(s) 175. Once a stop request has been received, sync control unit 125 determines whether it is a master slave card (step 435). If it is a slave card, then sync control unit 125 forwards the stop request on to the master card (step 440). The stop request is forwarded to the mater card in the same way the start request was forwarded, as described above with respect to step 415. Once the master card receives the stop request, it then sends a stop instruction to all slaves, effectively disabling event collection (step 445).

FIG. 5 is similar to FIG. 4, but illustrates a flow diagram for a synchronization process in which there are no master or slave cards. As described above with respect to FIG. 3, all cards in this embodiment receive a synchronization signal from the same external source 105, such as a time-based GPS. As shown in FIG. 5, the method begins with collection control unit 115 determining whether it has received a start instruction from target processor(s) 200, host computer 300 or physical system electrical device(s) 175 (step 505). Target processor 200 may transmit a start instruction when the instrumented computer software program running on target processor 200 calls a macro that requests the start of event collecting. Additionally, a user of host computer 300 may transmit a start instruction. Further, physical system electrical device(s) 175 may transmit a start request when a change of state occurs in electrical/electronic circuitry associated with device(s) 175. An event collection card, such as event collection card 100a, receiving a start request from physical system electrical device(s) 175 may broadcast the start request to other event collection cards (e.g., event collection cards 100b and 100c) via, for example, network 305.

The start instruction preferably identifies the absolute time at which event collection is to begin. Thus, event collecting will begin once time stamp clock 120 reaches the identified time. To synchronize all cards 100 to the same time, sync control unit 125 uses a periodic sync signal from external source 105 (step 510).

As described with respect to FIG. 4, the sync signal may include a pulse informing sync control unit 125 that time stamp clock 120 must be at a preset time. Upon receiving the sync signal, sync control unit 125 controls time stamp clock 120 to ensure that clock 120 is at the preset time. Thus, upon receipt of the sync signal, sync control unit 125 may increment time stamp clock 120 to the desired time if clock 120 has not yet reached the preset time. If, on the other hand, clock 120 reaches the preset time before the sync signal is received, then sync control unit 125 may stop time stamp clock 120 until the sync signal is received. If clock 120 reaches the preset time at the same time the sync signal is received, then clock 120 may simply continue without any interruption. The preset time is preferably hard-wired or software coded into sync control unit 115.

External source 105 periodically sends the sync signal to all event collection cards 100. In systems consistent with the invention, the sync signal may be sent periodically using a preset period such as, for example, a period of 100 microseconds (e.g., sync signal sent every 100 microseconds). Thus, each time a sync signal is received, sync control unit 125 will ensure that the time of clock 120 is at an appropriate multiple of the preset period (for example, a multiple of 100 microseconds). In this way, all event collection cards 100 periodically resynchronize upon receipt of the sync signal.

Once time stamp clock 120 reaches the time identified by the start instruction, then sync control unit 125 will instruct collection control unit 115 to begin collecting events (step 515). Event collection card 100 then collects event information until it receives a stop instruction (step 520). Like the start instruction, the stop instruction may be received from either target processor(s) 200, host computer 300, physical system electrical device(s) 175, or other event collection cards (e.g., event collection cards 100b or 100c). The stop instruction preferably identifies the absolute time that event collection is to stop. Once time stamp clock 120 reaches the time identified by the stop instruction, then sync control unit 125 will instruct collection control unit 115 to stop, collecting events (step 525).

Figure 6:
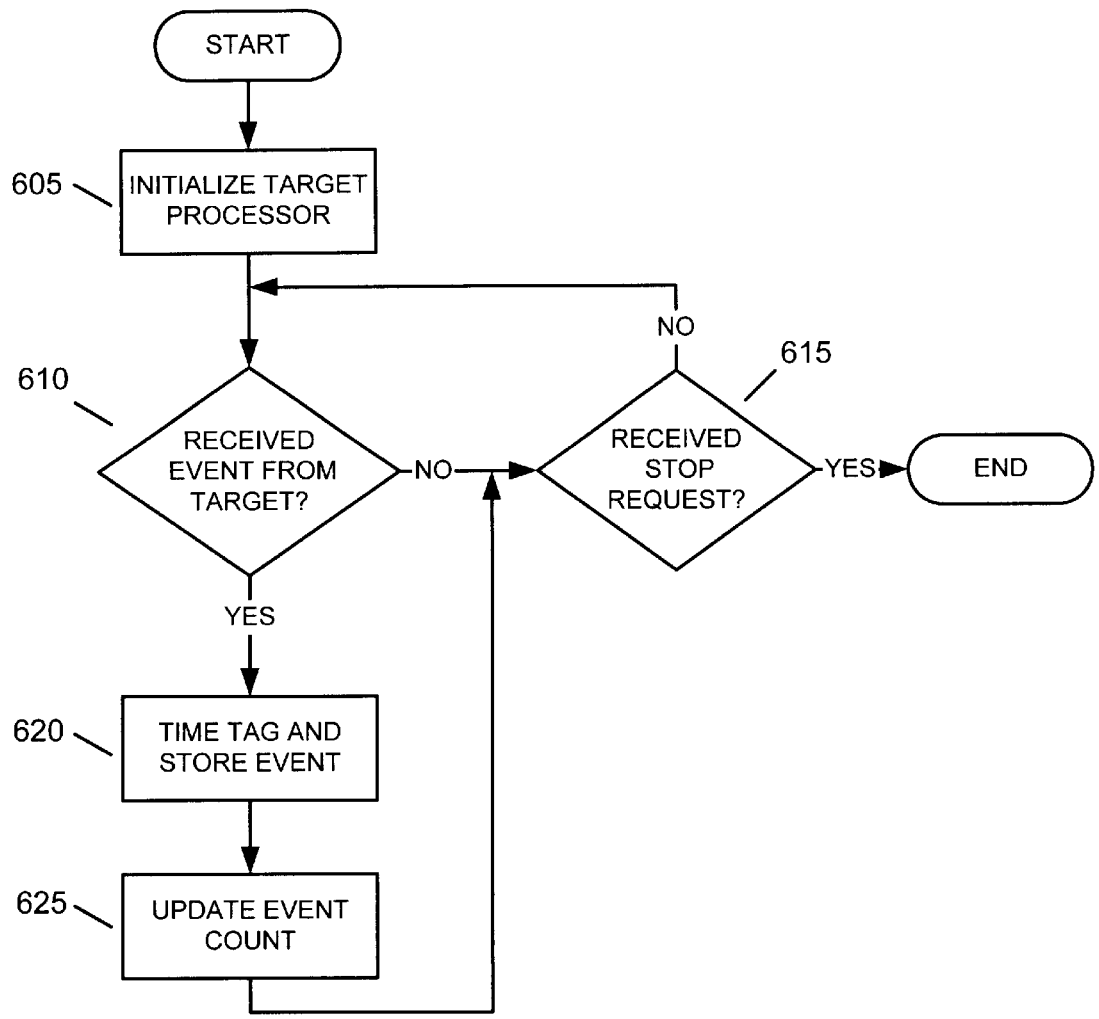
FIGS. 6 and 7 are flow diagrams illustrating event collection methods consistent with the present invention.
Figure 7:
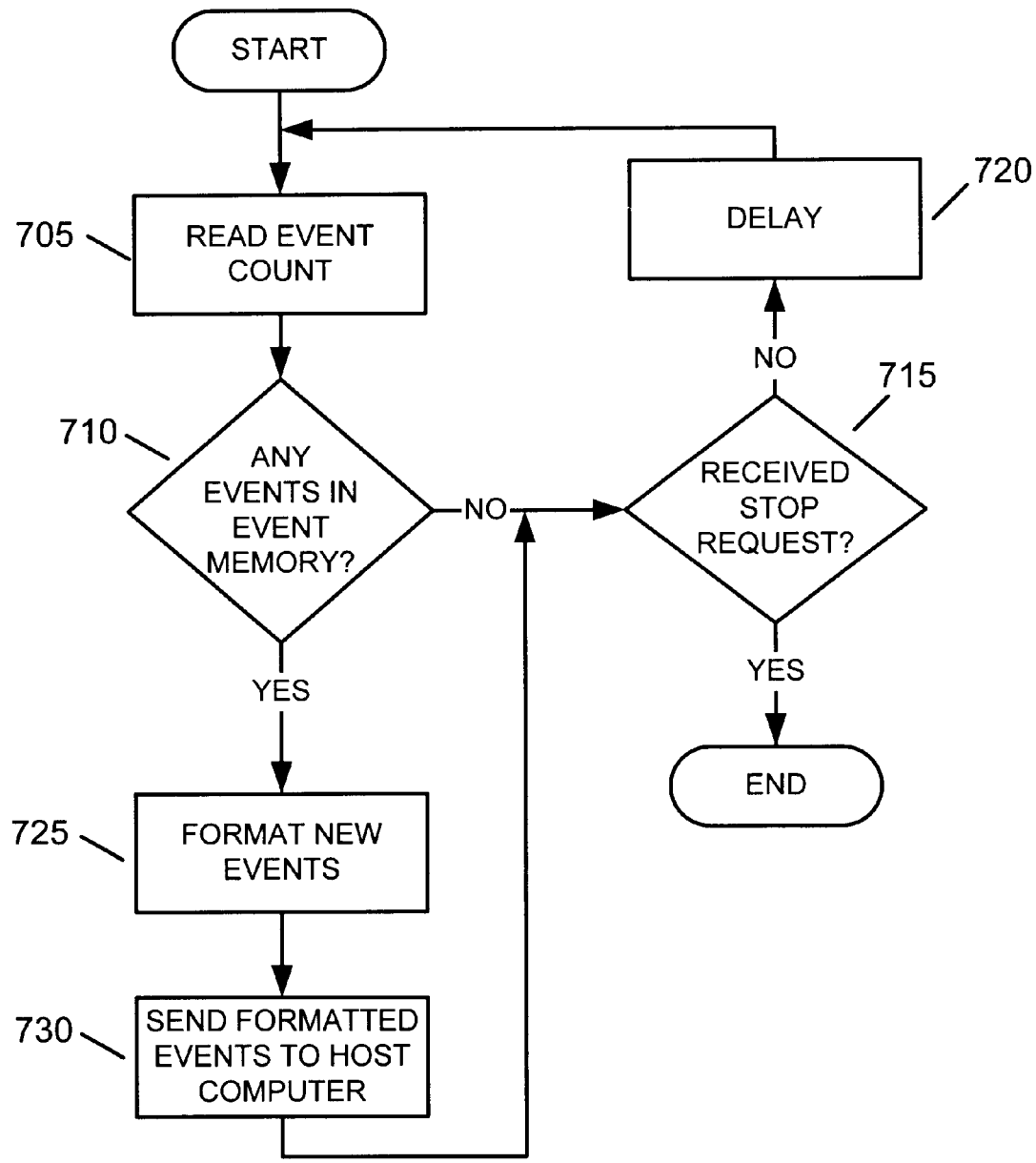

FIGS. 6 and 7 are flow diagrams illustrating event collection methods consistent with the present invention. In particular, FIG. 6 illustrates the event collection method for receiving event information from target processor(s) 200 or physical system electrical device(s) 175. FIG. 7, on the other hand, illustrates the processing of event information by CPU 145 prior to sending the event information to host computer 300.

As shown in FIG. 6, target processor(s) 200 and physical system electrical device(s) 175 first initialize with event collection card 100 (step 605). As described above, each monitored program along with each program thread is assigned a unique address range. As target processor 200 writes events for that program, it writes the event information to the specified address range. Additionally, each physical system electrical device 175 is assigned a unique address range. As physical system electrical device(s) 175 writes events relating to changes of state, it writes the event information to the specified address range. Event collection card 100 then waits until it receives event information from target processor(s) 200 or physical system electrical device(s) 175 (step 610). Further, if collection control unit 115 receives a stop instruction from either the master card, target processor(s) 200, host unit 300, physical system electrical device(s) 175, or other event collection cards (e.g., event collection cards 100b or 100c), then event collection card 100 stops all events collection processing (step 615).

When event information is received, that is not the result of an electrical change-of-state, collection control unit 115 decodes the lower address bits to determine the event ID value of the physical system electrical device(s) 175 or the monitored computer program corresponding to the program thread that sent the event. Collection control unit 115 then time tags the ID value and any other data included in the event write, based on the current time of time stamp clock 120, and stores this information in event memory 110 (step 620). At about the same time, collection control unit 115 also updates a FIFO event count stored in control unit 115 (step 625). The event count is monitored by CPU 145 to determine when to process the event information before sending it to host computer 300, as described below with respect to FIG. 7.

As shown in FIG. 7, CPU 145 reads the event count located in collection control unit 115 to determine if memory 110 contains any new events (steps 705 and 710). As described above, the event count identifies the number of new events stored in event memory 110. Preferably, the event count is a total of all events currently stored in event memory 110. Collection control unit 115 increments the event count each time an event is stored and decrements the event count each time an event is read by CPU 145. Thus, CPU 145 may read the event count to determine if any new events are stored in event memory 110 and waiting to be processed by CPU 145.

CPU 145 preferably reads the event count during periods of inactivity on event collection bus 160. In this way, CPU 145 limits any intrusion into the collection of events from target processor(s) 200. CPU 145 may also read the event count, however, on a periodic basis or upon the receipt of an event count interrupt signifying that event memory 110 has reached a predetermined storage threshold. Furthermore, for CPU 145 to read the event count, bus isolation unit 165 first allows communication between buses 160 and 162.

To this end, CPU 145 sends a request to collection control unit 115 requesting that control unit 115 forward to CPU 145 any new events stored in event memory 110. Collection control unit 115 instructs bus isolation unit 165 to grant CPU 145 to access to event collection bus 160 during periods of inactivity. During these periods, CPU 145 may communicate with and/or access event memory 110 and collection control unit 115.

If event memory 110 does not contain any new events, then, unless CPU 145 receives a stop instruction, CPU 145 will wait until a later time to again read the event count (steps 715 and 720). The stop instruction is the same as that described above with respect to step 615. If new events are stored in memory 110, then CPU 145 downloads the event information into memory (e.g., memory 140) for formatting into a format compatible with the event visualization software resident on host computer 300 (step 725). Once the event information is reformatted, CPU 145 sends the formatted event information to host computer 300 (step 730), and processing returns to step 715. If link 310 is busy, CPU 145 may store the formatted events in memory until after event collection is completed.

Conclusion

Systems and methods consistent with the present invention collect events from computer software programs running on multiple computers throughout a distributed system. Such systems and methods consistent with the present invention can monitor any program for execution in a multiprocessor system regardless of the computer programming language. For example, both C++ and Java are programming languages commonly used to develop programs for execution by multiprocessor computer systems.

Systems and methods consistent with the present invention further collect events from physical system electrical devices relating to changes in the state of associated physical processes. Systems and methods consistent with the present invention can, thus, monitor changes in the state of physical processes located throughout a distributed system.

The foregoing description of preferred embodiments of the present invention provides illustration and description, but it is not intended to be exhaustive or to limit the invention to the precise form disclosed. Modifications and variations are possible in light of the above teachings or may be acquired from practice of the invention. For example, the described implementation includes software and hardware, but elements of the present invention may be implemented as a combination of hardware and software, in software alone, or in hardware alone. Further, the invention may be implemented with both object-oriented and non-object-oriented programming systems. For example, while certain components of the invention have been described as implemented in hardware and others in software, other configurations may be possible. Also, while series of steps have been described with regard to FIGS. 4–7, the order of the steps may be varied in other implementations consistent with the present invention. No element, step, or instruction used in the description of the present application should be construed as critical or essential to the invention unless explicitly described as such.

Although aspects of the present invention are described as being stored in memory, one skilled in the art will appreciate that these aspects can also be stored on other types of computer-readable media, such as secondary storage devices, like hard disks, floppy disks, CD-ROM, an Internet connection, or other forms of RAM or ROM. The scope of the invention is defined by the claims and their equivalents.

What is claimed is:

1. In an apparatus for collecting events relating to a physical system, an event collection card is configured to receive events from the physical system, the event collection card comprising:
   a time stamp clock configured to provide a time stamp when each event is received;
   an event memory configured to store the received events;
   a sync interface unit configured to receive a sync signal;
   a sync control unit configured to synchronize the time stamp clock to the sync signal received by the sync interface; and
   a collection control unit configured to time stamp the collected events according to the time stamp clock synchronized to the sync signal, and for storing the time stamped events in the event memory,
   wherein the event collection card is configured to send the collected events to a host computer for processing, the event collection card further comprising:
      a bus interface unit connected to an event collection bus and configured to receive the events and forward the received events to the collection control unit over the event collection bus;
      a processing unit connected to a local bus and configured to send the collected events to the host computer; and
      a bus isolation unit configured to allow the event collection bus and the local bus to operate in parallel.

2. The apparatus of claim 1, further comprising:
   an external event interface configured to receive change of state signals relating to the physical system.

3. The apparatus of claim 2, wherein the change of state signals relate to changes in state of electrical circuitry associated with the physical system.

4. The apparatus of claim 3, wherein the changes in state of the electrical circuitry are associated with corresponding changes in state of the physical system.

5. The apparatus of claim 1, wherein the sync interface unit is configured to periodically receive the sync signal, and periodically synchronize the time stamp clock by setting the time stamp clock to a preset value upon receipt of the sync signal.

6. The apparatus of claim 5, wherein the sync control unit is configured to increment the time stamp clock to the preset value when the time stamp clock has not reached the preset value when the sync signal is received.

7. The apparatus of claim 5, wherein the sync control unit is configured to stop the time stamp clock when the time stamp clock reaches the preset value before the sync signal is received.

8. The apparatus of claim 1, wherein the sync interface unit is configured to receive the sync signal from a time-based global positioning system.

9. The apparatus of claim 1, wherein the sync interface unit is configured to receive the sync signal from an atomic clock.

10. The apparatus of claim 1, wherein the sync interface unit is configured to receive the sync signal from a synchronous wide area network clock.

11. The apparatus of claim 1, wherein the bus isolation unit is configured to allow the processing unit to access the event memory via the local bus and the event collection bus.

12. The apparatus of claim 1, wherein the collection control unit is configured to initialize a target processor running a target program generating the events prior to collecting the events by assigning an address range to the target processor, the target processor using the assigned addresses when sending events to the event collection card.

13. The apparatus of claim 12, wherein the collection control unit is configured to determine an identification value by decoding the address to which the target processor has sent the event, the identification value corresponding to the target program associated with the target processor.

14. The apparatus of claim 13, wherein the collection control unit is configured to time stamp the identification value and store the time stamped identification value in the event memory.

15. The apparatus of claim 1, wherein the collection control unit is configured to update a memory count for each time stamped event stored in the event memory and sends the collected events to a host computer for processing; and
   wherein the event collection card further comprises:
      a processing unit configured to send the collected events to the host computer according to the memory count.

16. The apparatus of claim 1, wherein the collection control unit is configured to initialize an electrical device associated with the physical system prior to collecting events by assigning an address range to the electrical device, the electrical device using the assigned addresses when sending events to the event collection card.

17. The apparatus of claim 16, wherein the collection control unit is configured to determine an identification value by decoding the address to which the electrical device has sent the event, the identification value corresponding to the electrical device.

18. The apparatus of claim 17, wherein the collection control unit is configured to stamp the identification value and store the time stamped identification value in the event memory.

19. A system for collecting events relating to a plurality of distributed physical systems, comprising:
   a plurality of event collection cards, each receiving events from a respective one of the plurality of distributed physical systems, and wherein each event collection card comprises:
      a time stamp clock configured to provide a time stamp when each event is received;
      an event memory configured to store the received events;
      a sync control unit configured to synchronize the time stamp clock to a received sync signal; and
      a collection control unit configured to time stamp the collected events according to the time stamp clock synchronized to the sync signal, and configured to store the time stamped events in the event memory, wherein one of the plurality of event collection cards operates as a master card and at least one other event collection card operates as a slave card; and wherein: the sync control unit of the at least one slave card is configured to synchronize the time stamp clock of the slave card to the time stamp clock of the master card.

20. The system of claim 19, wherein the collection control unit is configured to receive a start request requesting that the collection control unit begin collecting events; and the sync control unit is configured to determine, when the collection control unit receives the start signal, whether the event collection card is a master card or a slave card and transmits a sync signal to the slave card only when the event collection card is a master card.

21. The system of claim 19, wherein the plurality of event collection cards are daisy-chain connected to one another.

22. The method of claim 1, further comprising:

incrementing the time stamp clock to the preset value when the time stamp clock has not reached the preset value when the sync signal is received.

23. The method of claim 1, further comprising:

stopping the time stamp clock when the time stamp clock reaches the preset value before the sync signal is received.

24. The system of claim 19, wherein each collection card further comprises:

an external event interface configured to receive change of state signals relating to a respective one of the plurality of distributed physical systems.

25. The system of claim 24, wherein the change of state signals relate to changes in a state of electrical circuitry associated with the respective one of the plurality of distributed physical systems.

26. The system of claim 25, wherein the changes in state of the electrical circuitry are associated with corresponding changes in state of the respective one of the plurality of distributed physical systems.

27. A method of collecting events relating to distributed physical systems, comprising:

collecting events relating to a respective one of a plurality of distributed physical systems;

receiving a sync signal;

synchronizing a time stamp clock to the received sync signal;

time stamping the collected events according to the time stamp clock synchronized to the sync signal;

storing the time-stamped events;

sending the collected events to a host computer for processing;

receiving events from a target processor over an event collection bus;

sending the collected events to the host computer using a local bus; and allowing the event collection bus and the local bus to operate in parallel.

28. The method of claim 27, further comprising:

periodically receiving the sync signal; and periodically synchronizing the time stamp clock by setting the time stamp clock to a preset value upon receipt of the sync signal.

29. The method of claim 27, further comprising:

receiving the sync signal from a time-based global positioning system.

30. The method of claim 27, further comprising:

receiving the synch signal from a synchronous wide area network clock.

31. The method of claim 27, further comprising:

receiving the sync signal from an atomic clock.

32. The method of claim 27, further comprising:

initializing the target processor prior to collecting events by assigning an address range to the target processor, wherein the target processor uses the assigned addresses when sending events to the event collection bus.

33. The method of claim 32, further comprising:

determining an identification value by decoding the address to which the target processor has sent the event, wherein the identification value corresponds to a target program associated with the target processor.

34. The method of claim 33, further comprising:

time stamping the identification value; and storing the time-stamped identification value.

35. The method of claim 27, further comprising:

updating a memory count for each stored time-stamped event;

sending the collected events to a host computer according to the memory count.

36. The method of claim 27, further comprising:

initializing electrical devices associated with each of the plurality of distributed physical systems prior to collecting events by assigning an address range to each electrical device, wherein each electrical device uses the assigned addresses when sending events to an event collection bus.

37. The method of claim 27, further comprising:

determining identification values by decoding the address to which each electrical device has sent events, wherein each identification value corresponds to an electrical device.

38. The method of claim 37, further comprising:

time stamping the identification value; and storing the time-stamped identification value in the event memory.

39. A system for collecting events relating to distributed physical systems, comprising:

means for collecting events relating to a respective one of a plurality of distributed physical systems;

means for receiving a sync signal;

means for synchronizing a time stamp clock to the received sync signal;

means for time stamping the collected events according to the time stamp clock synchronized to the sync signal;

means for storing the time-stamped events;

means for sending the collected events to a host computer for processing;

means for receiving events from a target processor over an event collection bus;

means for sending the collected events to the host computer using a local bus; and means for allowing the event collection bus and the local bus to operate in parallel.

40. A system for collecting events relating to a plurality of distributed physical systems, comprising:

a first event collection card configured to receive first events from a first distributed physical system of the plurality of distributed physical systems, the first event collection card comprising:
- a first time stamp clock configured to provide a time stamp when each of the first events is received;
- a first event memory configured to store the received first events;
- a first sync control unit configured to synchronize the first time stamp clock to a received sync signal; and
- a first collection control unit configured to time stamp the stored first events according to the first time stamp clock synchronized to the sync signal and store the time stamped first events in the first event memory; and a second event collection card configured to receive second events from a second distributed physical system of the plurality of distributed physical systems, the second event collection card comprising:
- a second time stamp clock configured to provide a time stamp when each of the second events is received;
- a second event memory configured to store the received second events;
- a second sync control unit configured to synchronize the second time stamp clock to the received sync signal; and
- a second collection control unit configured to time stamp the stored second events according to the second time stamp clock synchronized to the sync signal, and configured to store the time stamped second events in the second event memory.

* * * * *